United States Patent
Machida (10) Patent No.: US 6,715,765 B2
(45) Date of Patent: Apr. 6, 2004

(54) SEALING STRUCTURE OF A BALL BEARING

(75) Inventor: Shin-ichi Machida, Langen (DE)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/087,219

(22) Filed: Mar. 4, 2002

(65) Prior Publication Data
US 2002/0130470 A1 Sep. 19, 2002

(30) Foreign Application Priority Data

Mar. 5, 2001 (JP) ........................... 2001-059751

(51) Int. Cl.[7] ............... F01D 11/00; F16J 15/44; F16J 15/447; F16C 33/76
(52) U.S. Cl. .............. 277/409; 384/478; 384/488; 277/411; 277/421
(58) Field of Search ............... 277/409, 411, 277/421, 423–430, 500, 549, 550, 551, 552; 384/478, 135, 488, 477

(56) References Cited

U.S. PATENT DOCUMENTS

| 4,156,470 A | * | 5/1979 | Bodine et al. | 175/313 |
| 4,181,312 A | * | 1/1980 | Douglas | 277/423 |
| 4,223,749 A | * | 9/1980 | Bodine et al. | 175/227 |
| 4,446,933 A | * | 5/1984 | Bodine | 175/229 |
| 4,808,012 A | * | 2/1989 | Otto | 384/482 |
| 5,242,229 A | * | 9/1993 | McLarty | 384/484 |
| 5,372,435 A | * | 12/1994 | Genero et al. | 384/448 |
| 5,560,715 A | * | 10/1996 | Mosby | 384/477 |
| 5,860,748 A | * | 1/1999 | Okumura et al. | 384/486 |
| 5,893,648 A | * | 4/1999 | Smith | 384/448 |
| 5,947,611 A | * | 9/1999 | Nagase | 384/448 |
| 5,979,903 A | * | 11/1999 | Kwasniewski | 277/423 |
| 6,068,407 A | * | 5/2000 | Kobayashi et al. | 384/488 |

FOREIGN PATENT DOCUMENTS

| JP | 410110695 A | * | 4/1998 |
| JP | 02001263359 A | * | 9/2001 |
| JP | 02002227859 A | * | 8/2002 |

* cited by examiner

Primary Examiner—Anthony Knight
Assistant Examiner—Vishal Patel
(74) Attorney, Agent, or Firm—Lorusso, Loud & Kelly (57) ABSTRACT

A sealing structure of a ball bearing is disclosed wherein a seal or a shield is provided on at least one side of the ball bearing, the ball bearing allowing rotation of either an outer ring or an inner ring. A large number of blades extend radially along an outer surface of the seal or shield provided on one side of the ball bearing. An annular plate may be mounted on a shaft with the inner ring fitted thereon at a position relatively close to the blade projections. Plural through holes may be formed circumferentially on or near an inner peripheral edge of the annular plate. Thus, a simple structure effectively prevents fluid from flowing or leaking through the ball bearing and also prevents leakage of grease from the ball bearing.

13 Claims, 6 Drawing Sheets

SEALING STRUCTURE OF A BALL BEARING

CROSS-REFERENCE TO RELATED APPLICATIONS

This application claims, under 35 USC 119, priority of Japanese Application No. 2001-059751 filed Mar. 5, 2001.

BACKGROUND OF THE INVENTION

1. Field of the Invention

The present invention relates to a sealing structure of a ball bearing and more particularly to a sealing structure of a ball bearing wherein a seal or a shield is provided on at least one side of the ball bearing to further improve the sealing performance.

2. Description of the Prior Art

Conventional ball bearings, a type of roller bearing, include shield ball bearings, wherein a shield formed of a stainless steel plate is provided on a side of the bearing, and a seal ball bearing wherein a seal formed of a material such as synthetic rubber, thermoplastic resin or elastomer is provided on a side of the bearing.

In the shield ball bearing, invasion of foreign matter or dust into the bearing is prevented, and in the case where grease is sealed in the interior of the bearing, leakage of the grease to the exterior is prevented. In the seal ball bearing, sealing is enhanced to a greater extent than in a shield ball bearing, and the invasion of foreign matter or dust into the bearing and the leakage of grease from the bearing are prevented more effectively.

Generally, such a shield or seal is fixed to an outer ring of the ball bearing. Both a singe shield (seal) type with the shield (seal) provided on only one side of the bearing and a double shield (seal) type with the shield (seal) provided on both sides of the bearing are available. Usually, the shield is provided on an outer ring and spaced from an inner ring so as to define a slight gap therebetween. The sealed ball bearings include a non-contact type wherein the seal does not contact the inner ring and a contact type wherein the seal is in contact with the inner ring.

For all structures and types of ball bearings, applications requiring higher sealing performance have recently been increasing.

Figure 5:
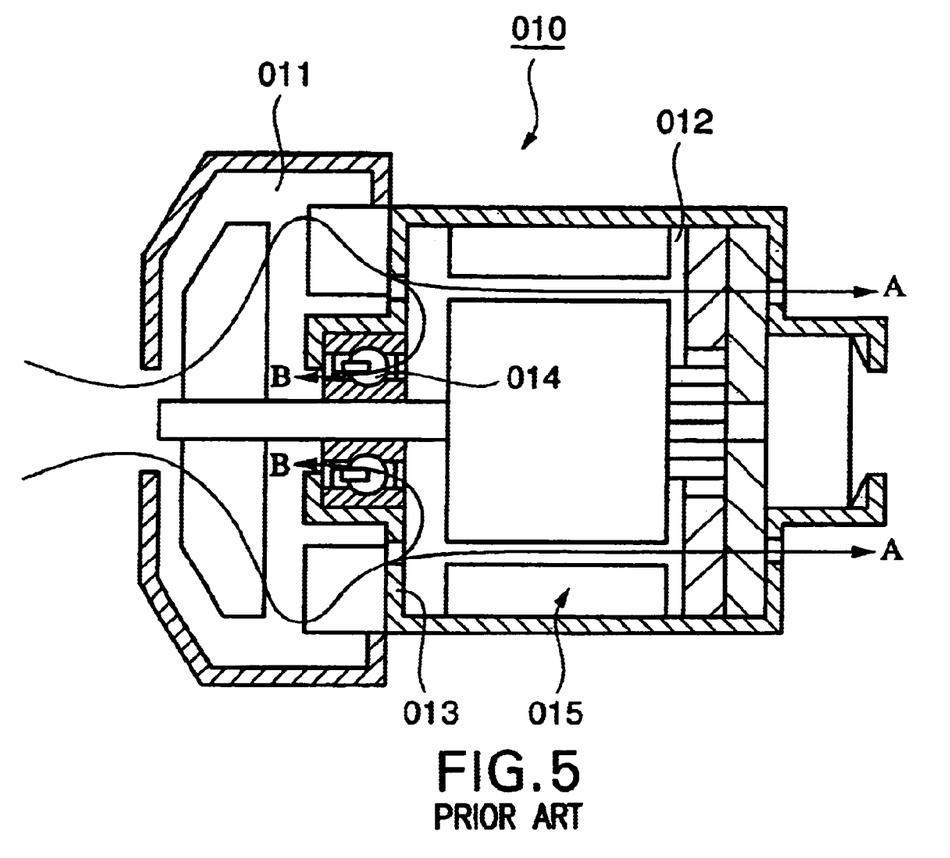
FIG. 5 illustrates a conventional ball bearing.

For example, in a conventional vacuum cleaner 010 which is one example of application of a ball bearing provided with a seal or a shield, as shown in FIG. 5, high-pressure air present in a fan-driving motor chamber 012, which also serves as a discharge chamber, may flow in reverse into fan chamber 011 through a ball bearing 014 mounted in a partition wall 013 which separates the fan chamber 011 from the motor chamber 012. In FIG. 5, a streamline A represents normal air flow, while a streamline B represents the reverse flow of air into the fan chamber 011. When such a phenomenon occurs, the power consumption of motor 015 increases and the efficiency of the device using the ball bearing is reduced; moreover, grease sealed in the ball bearing 014 leaks out, resulting in burnout of the bearing and shortening life of the device.

Figure 6:
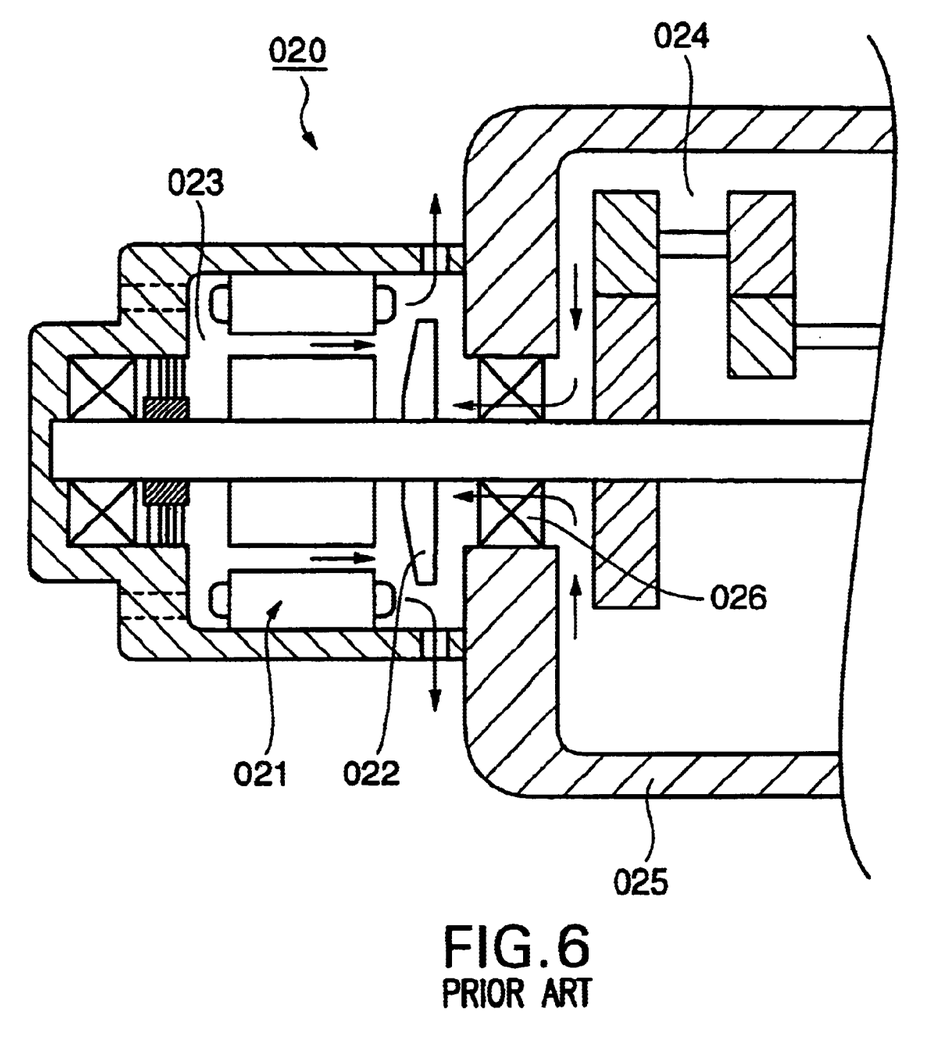
FIG. 6 illustrates another conventional ball bearing.

Likewise, in a motor-driven tool 020 which is another example of application of a ball bearing, as shown in FIG. 6, grease present in a gear chamber 024 may leak into motor-fan chamber 023, accommodating both a drive motor 021 and a motor cooling fan 022, through a ball bearing 026 mounted in a wall of gear box 025, defining the gear chamber 024 and partitioning the motor-fan chamber 023 and the gear chamber 024. This is because the grease present in the gear chamber 024 is sucked into the motor-fan chamber 023 through the ball bearing 026 by virtue of a negative pressure present at a central portion of the fan 022. The occurrence of such a phenomenon not only reduces the meshing efficiency of gears disposed within the gear box 025 but also results in burnout of gears and shortening the life of the device.

The same phenomenon can occur also in the case where a bearing of a rotary shaft of an impeller is exposed to a high-pressure fluid on the discharge side in a blower where the difference in pressure between the suction side and the discharge side is large.

In such applications as referred to above, it has come to be more and more demanded that the ball bearing be capable of preventing flow or leakage of air or grease through spaces defined on both sides of the ball bearing or capable of preventing grease sealed in the ball bearing itself from leaking out to a lower-pressure space located on one side of the ball bearing.

SUMMARY OF THE INVENTION

The present invention has been designed for solving the abovementioned problems associated with the conventional ball bearing sealing structure and it is an object of the present invention to provide a ball bearing sealing structure capable of effectively preventing, with a simple structure, flow or leakage of fluid through spaces formed on both sides of the ball bearing, also capable of effectively preventing grease sealed in the ball bearing itself from leaking into a lower-pressure space on one side of the ball bearing, and thus providing improved sealing performance.

In a first aspect of the present invention there is provided a sealing structure of a ball bearing wherein a seal or a shield is provided on at least one side of the ball bearing and the ball bearing allows rotation of an outer ring, characterized in that a large number of blades project radially from an outer surface of the seal or the shield provided on one side of the ball bearing.

Upon rotation of the outer ring, the seal or the shield rotates together with the outer ring, and the blade projections formed on the outer surface of the seal or the shield cause fluid which is in contact with the said outer surface to be moved radially outward by centrifugal force in an apparatus in which the ball bearing is applied. The blade projections exhibit a pumping action on the fluid which is in contact with the outer surface of the seal or the shield.

The ball bearing is disposed so that the side with the blade projections on the seal or shield faces the space with the higher pressure, whereby fluid present near the inner ring flows radially outward in the space with the higher pressure, resulting in a drop in pressure within this region and in a decrease or reversal of the pressure difference of fluids near and on opposing sides of the inner ring.

As a result, undesirable flow or leakage of fluid from the space with higher pressure to the space with lower pressure, through the ball bearing, is suppressed, permitting the ball bearing to exhibit enhanced sealing performance. Besides, the leakage of fluid (grease) sealed in the ball bearing to the lower-pressure space is suppressed.

In a second aspect, the present invention provides a sealing structure of a ball bearing wherein a seal or a shield is provided on at least one side of the ball bearing and the ball bearing allows rotation of an inner ring. Here also, a large number of blade projections extend radially on an outer surface of the seal or the shield provided on one side of the ball bearing, and an annular plate is mounted on a shaft with the inner ring fitted thereon at a position relatively close to the blade projections.

As the inner ring rotates, the annular plate rotates together with the inner ring through the shaft. Due to this rotation, in a device incorporating the ball bearing, fluid which is present in the region between the annular plate and the ball bearing is pulled by viscous force so as to rotate together with the annular plate. Therefore, the fluid present in the said region rotates relative to the blade projections and the blade projections cause the fluid present in this region and in contact with the said outer surface to flow radially outward by centrifugal force. Thus, the blade projections pump the fluid which is in contact with the outer surface of the seal or the shield.

The ball bearing is disposed so that its one side with the blade projections formed on the seal or shield faces the space on the side having the higher pressure, whereby the fluid present around the inner ring is caused to flow radially outward, with the result that the pressure of the fluid in this region (the region near the inner ring and between the annular plate and the ball bearing) drops and the difference in pressure between fluids present near and on opposing sides of the inner ring decreases or reverses.

As a result, undesirable flow or leakage of fluid from the higher-pressure space to the lower-pressure space through the ball bearing is suppressed and the seal provided by the ball bearing is enhanced. Moreover, leakage of fluid (grease) sealed in the ball bearing to the lower-pressure space is greatly decreased, whereby the seal provided by the ball bearing is enhanced.

In a third aspect of the present invention, a plurality of through holes are formed circumferentially on or near an inner peripheral edge of the annular plate. According to this configuration, in the region near the inner ring between the annular plate and the ball bearing the fluid pressure drops, and high-pressure fluid constantly flows through the plural through holes into that region of lower pressure from the higher-pressure space on the opposite side of the annular plate. Therefore, a circulation path is established, which path is free of reversal of flow of the fluid which undergoes the pumping action and the pumping action of the blades proceeds smoothly.

DETAILED DESCRIPTION OF PREFERRED EMBODIMENTS

A first embodiment of the present invention will now be described with reference to FIGS. 1 and 2.

Figure 1:
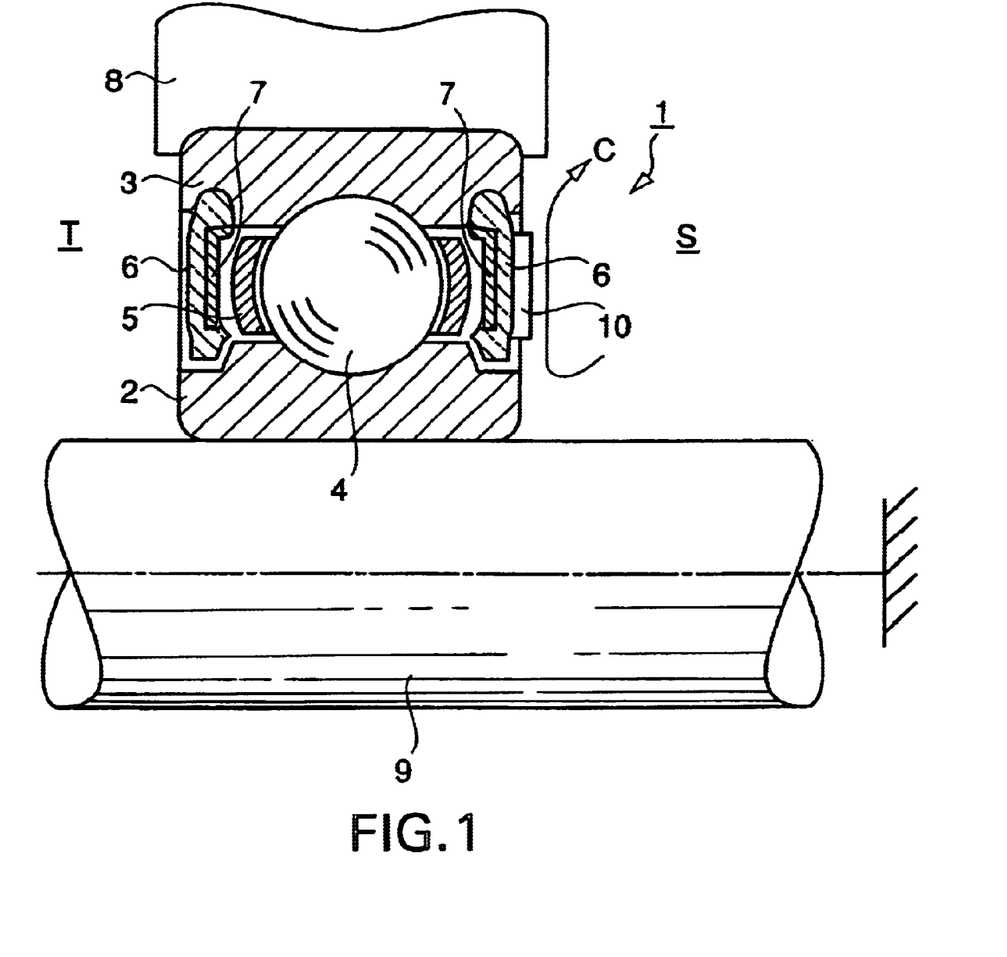
FIG. 1 is a partial, vertical sectional view of a ball bearing sealing structure according to a first embodiment of the present invention.
Figure 2:
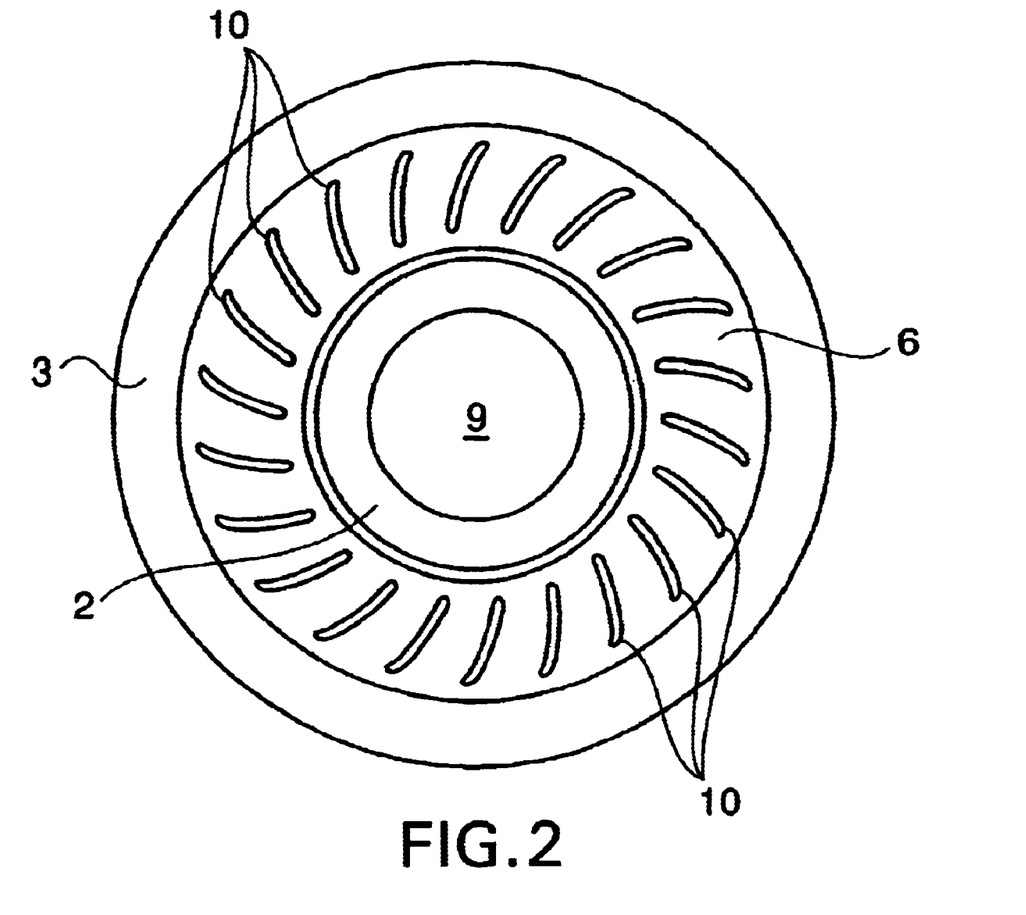
FIG. 2 is a front view thereof.

In a ball bearing 1 according to the first embodiment, as shown in FIGS. 1 and 2, a plurality of balls 4 are held between a raceway groove formed on the outer peripheral surface of an inner ring 2 and a raceway groove formed on the inner peripheral surface of an outer ring 3 by means of a retainer 5. On both sides of the ball bearing 1 are provided seals 6 which are formed of a rubber material and which are fitted in the outer ring 3. Ends of the seals 6 are not in contact with the inner ring 2, and a slight gap exists therebetween. Thus, the ball bearing 1 has the structure and form of a double seal/non-contact seal ball bearing. A core 7 is molded within inner surface of each seal 6.

The ball bearing 1 is used so that the outer ring rotates. Therefore, in a device incorporating the ball bearing 1, the outer ring 3 is fitted from the inside into an annular recess formed in a wall 8 of a rotating element, while the inner ring 2 is fitted around the exterior of a fixed shaft 9.

The right-hand space S in FIG. 1 is at a higher pressure than the left-hand space T and, for example, can be a space for discharge of fluid, for example, air in a fluid machine, or can be a grease storing space within a gear box of a motor-driven tool.

The seal 6 fitted in the outer ring 3 on one side of the ball bearing 1 facing space S, has a large number of blades 10 ("blade projections") projecting radially from the outer surface of the seal. It is preferable that the blade projections 10 be formed by molding integrally with the body portion of the seal 6. The blade projections 10 are designed to have optimum length, thickness, height and shape for effective pumping of the fluid in the space S, as will be described later. Although in this first embodiment the blade projections 10 are curved, they may be formed in a rectilinear shape.

The seals 6 fitted in the outer ring 3 on both sides of the ball bearing 1 hold grease sealed in the interior of the ball bearing so as to prevent leakage of the grease to the exterior and to protect the ball bearing by preventing the invasion of foreign matter and dust into the interior of the bearing. Where there is a pressure difference between the spaces S and T formed on opposing sides of the ball bearing 1, the sealing function partially prevents flow or leakage of fluid from the higher-pressure space S to the lower-pressure space T.

Since in this first embodiment a large number of blade projections 10 are formed to extend radially from the outer surface of the seal (hereinafter referred to as the "high pressure-side seal") 6 provided on one side of the ball bearing 1 facing the higher-pressure space S, the following sealing effects can be expected in addition to the above-mentioned sealing effects.

When the outer ring 3 rotates, the seals 6 rotate together with the outer ring, and the blade projections 10 formed on the outer surface of the high pressure-side seal 6 propel the fluid (e.g., air or grease) which is in contact with the outer surface radially outwards (see streamline C in FIG. 1) by virtue of centrifugal force in an apparatus incorporating the ball bearing 1. That is, the blade projections 10 exhibit a pumping action on the fluid which is in contact with the outer surface of the high pressure-side seal 6.

Within the higher-pressure space S, because the fluid present around the inner ring 2 is propelled radially outwards, the fluid pressure in this region drops and the pressure difference between the fluids present near the inner ring in spaces S and T partitioned by the ball bearing 1 decreases or reverses. The "fluid present near the inner ring 2" refers to the fluid present in a region to the side S of the inner ring 2 which includes that portion near the gap formed between the end of seal 6 and the outer peripheral surface of the inner ring 2 and on which the pumping action of the blade projections 10 is exerted.

As a result, undesirable flow or leakage of fluid from the higher-pressure space S to the lower-pressure space T through the ball bearing 1 is suppressed and the amount of such flow or leakage is remarkably decreased, whereby the ball bearing 1 provides a high degree of sealing. Where grease is sealed in the ball bearing 1, leakage of the grease to the lower-pressure space T is suppressed and the amount of leaking grease is greatly decreased, and thus the ball bearing 1 also exhibits good sealing of the grease.

Flow or leakage of fluid from the higher-pressure space S to the lower-pressure space T through the ball bearing 1 occurs mainly through the gap between the inner and outer rings 2, 3 of the ball bearing 1, but can also occur through a slight gap between the inner ring 2 and the fixed shaft 9.

In this first embodiment the seal 6 may be substituted by a shield and blade projections 10 as described above may be formed on an outer surface of the shield. In this case also, the ball bearing 1 exhibits good sealing performance.

The material of each seal 6 or shield and the method of its manufacture are not specially limited. Any of the following known materials: metals, plastics, thermoplastic elastomers, and synthetic rubbers, and known forming methods may be adopted.

Examples of suitable metallic materials include cold rolled steel plate, stainless steel, spring steel, aluminum alloy, and copper alloy.

Examples of suitable plastics include thermoplastic resins such as polyamide, polyacetal, polybutyrene terephthalate, polyethylene terephthalate, polycarbonate, and polyimide resins.

Examples of suitable thermoplastic elastomers include polyamide, polyester, polyurethane, polyolefins, polystyrene, and polyvinyl chloride elastomers.

Examples of suitable synthetic rubbers include nitrile, acrylic, silicone, fluorine-containing, and ethylene-propylene rubbers.

Suitable methods for forming a metallic shield and a reinforcing ring include plastic working methods such as press working.

Examples of the method for forming a seal or a member as a constituent of the seal using a plastic or a thermoplastic elastomer include injection molding, compression molding, and transfer molding.

The material of the inner and outer rings 2, 3 and rolling elements (balls) 4 which constitute the ball bearing 1 in this first embodiment, likewise, is not specifically limited. Examples include metals such as iron and steel, ceramics and plastics. These may be used alone or in combination.

A second embodiment of the present invention will now be described with reference to FIG. 3.

Figure 3:
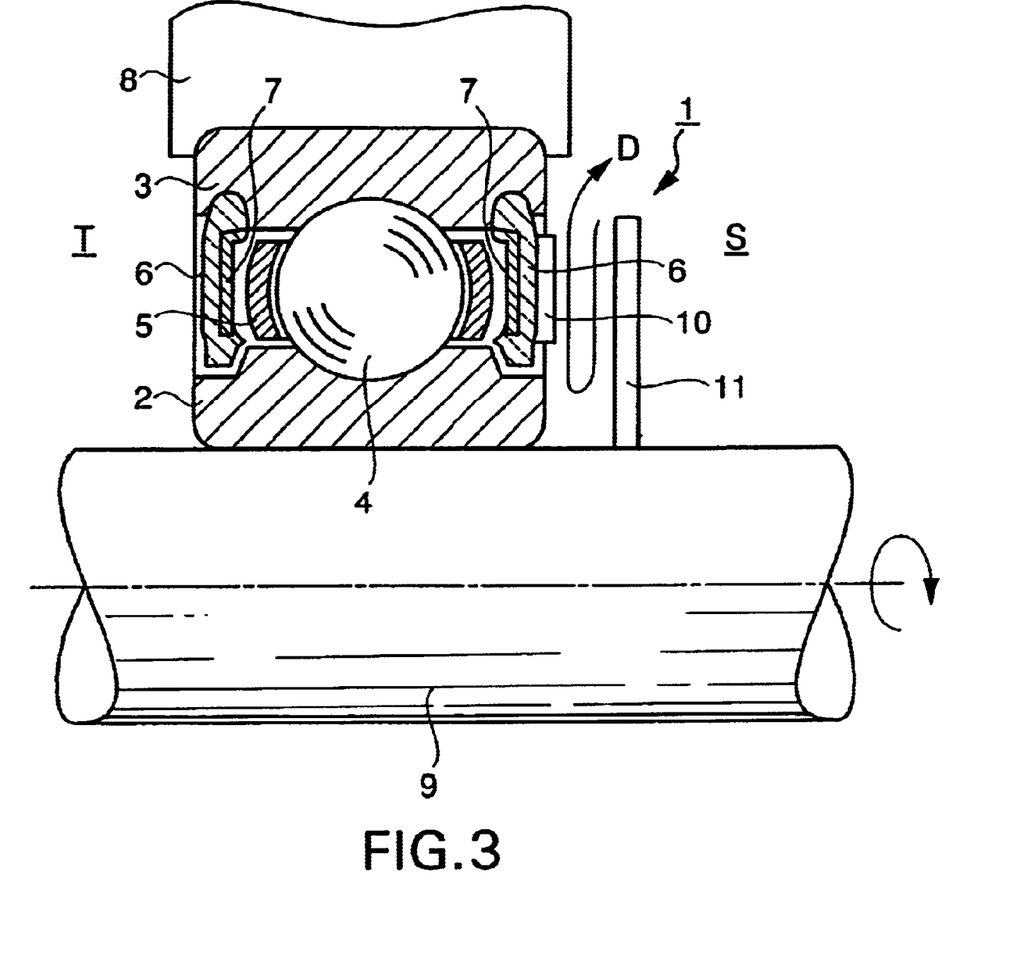
FIG. 3 is a partial, vertical sectional view of a ball bearing sealing structure according to a second embodiment of the present invention.

FIG. 3 is a partial, vertical sectional view of a ball bearing sealing structure according to the second embodiment, in which the same components as in the ball bearing sealing structure of the first embodiment are identified by the same reference numerals as in the first embodiment.

As shown in FIG. 3, the sealing structure of the ball bearing 1 in this second embodiment is different from that of the first embodiment only in that an annular plate 11 is mounted on the shaft (rotary shaft) 9 with the inner ring 2 fitted thereon, at a position relatively close to the blade projections 10. Regarding use, the difference is that the ball bearing 1 in this second embodiment is used with rotation of the inner ring 2.

Other than the above-mentioned differences between the ball bearing sealing structure of the second embodiment and that of the first embodiment, the two are the same.

In the second embodiment, as the inner ring 2 rotates, the annular plate 11 rotates together with the inner ring 2 and the rotary shaft 9. Thus, within a device incorporating the ball bearing 1, the fluid present in the region between the annular plate 11 and the ball bearing 1 is rotated by virtue of a viscous force together with the annular plate 11, so that the fluid present in this region is imparted with a rotational motion relative to the blade projections 10 formed on the outer surface of the high pressure-side seal 6. The blade projections 10 cause the fluid (air or grease) which is in contact with the outer surface of the high pressure-side seal 6 in this region to flow radially outward by centrifugal force. At the same time, to replace the fluid thus forced radially outward, fluid flows from the outer periphery of the annular plate 11 toward the center thereof along the inner surface of the annular plate 11 (see streamline D in FIG. 3). That is, the blade projections 10 exhibit a pumping action for the fluid which is in contact with the outer surface of the seal 6.

Consequently, in the higher-pressure space S, the fluid present near the inner ring 2 is propelled radially outwards, the fluid pressure in this region (the region near the inner ring 2 and sandwiched between the annular plate 11 and the ball bearing 1) drops and the difference in pressure between the fluids present near the inner ring 2, in spaces S and T partitioned by the ball bearing 1, decreases or reverses.

As a result, undesirable flowing or leakage of fluid from the higher-pressure space S to the lower-pressure space T through the ball bearing 1 is suppressed and the amount of such flow or leakage is decreased to a remarkable extent, thus permitting the ball bearing 1 to exhibit enhanced sealing. Where grease is sealed in the ball bearing, leakage of the grease to the lower-pressure space T is suppressed and the amount of such leaking grease is greatly reduced, whereby the ball bearing 1 of the second embodiment likewise exhibits enhanced sealing of the grease.

Also in this second embodiment a shield may be substituted for the seal 6 and, with blade projections 10 as described above formed on the outer surface of the shield, the ball bearing 1 can exhibit the same enhancement of sealing performance as above.

Figure 4:
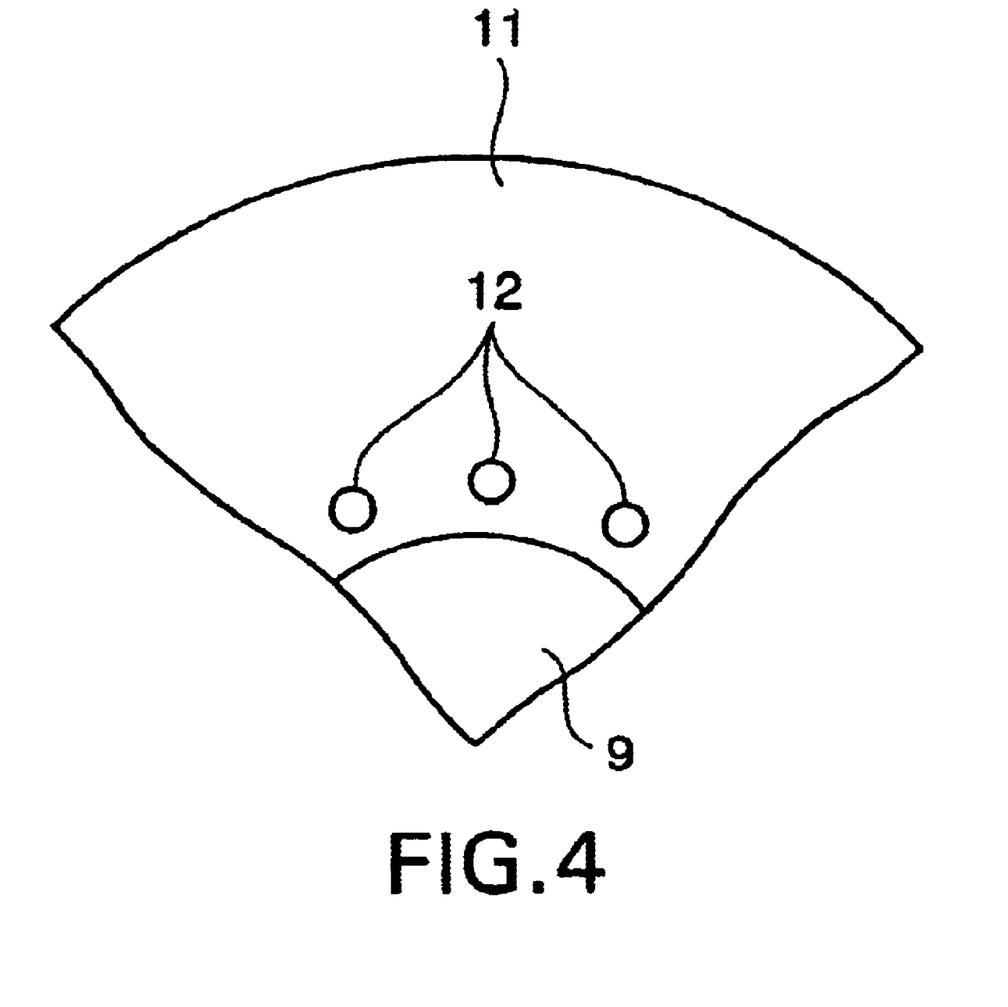
FIG. 4 is a partial front view of an annular plate used in a ball bearing sealing structure according to a third embodiment of the present invention.

A third embodiment of the present invention will now be described with reference to FIG. 4. FIG. 4 is a partial front view of a portion of an annular plate used in a ball bearing sealing structure according to this third embodiment, in which elements which are the same portions as in the ball bearing sealing structure of the second embodiment are identified by the same reference numerals as used in describing the second embodiment.

In the sealing structure of a ball bearing 1 according to this third embodiment, as shown in FIG. 4, a plurality of through holes 12 are formed circumferentially in the vicinity of an inner peripheral edge of the annular plate 11. Alternatively, the plural through holes 12 may be formed by cut-outs in the inner peripheral edge of the annular plate 11, each of a semicircular shape. Each through hole 12 is set to an appropriate size in relation to the pumping action of the blade projections 10.

Although the ball bearing sealing structure of the third embodiment differs from that of the previous second embodiment as described above, there is no other difference between the two, so a detailed description will here be omitted.

In the third embodiment fluid does not flow in reverse and flow out of the narrow region between the annular plate 11 and the ball bearing 1 (see the streamline D in FIG. 3), and a high-pressure fluid constantly moves into the reduced pressure region near the inner ring 2 included in the said narrow region, through the plural through holes 12 from the higher-pressure area S located on the side of the ball bearing 1 opposite the annular plate 11, whereby a circulation path is established free of flow reversal for the fluid which undergoes the pumping action. In this way the pumping action of the blade projections 10 proceeds smoothly and the foregoing effects attributed to the second embodiment can be further enhanced.

Although the ball bearings 1 described in the above first to third embodiments have the structure and form of a double-seal/non-contact type seal ball bearing or a double-shield/non-contact type shield ball bearing, the present invention is not so limited and may be applied to various other structures and forms, including double-seal/contact type, single-seal/non-contact type, and single-seal/contact type seal ball bearings, double-shield/ contact type, single-shield/non-contact type, and single-shield/contact type shield ball bearings, seal ball bearings having a seal of a double structure, and shield ball bearings having a shield of a double structure.

Various changes and modifications may be made within the scope not departing from the gist of the present invention.

What is claimed is:

1. A bearing comprising:
   inner and outer rings spaced to define an annular gap therebetween, said gap extending from a high pressure side to a low pressure side;
   a plurality of rolling elements held between said inner and outer rings for relative rotation between said inner and outer rings;
   a seal fixed to one of said inner and outer rings on the high pressure side, and extending across said gap to a point closely adjacent the other of said rings;
   a plurality of blades protruding from and extending radially along a high-pressure facing surface of said seal for reducing ambient pressure adjacent a high pressure side surface of said inner ring;
   a rotary shaft on which said inner ring is mounted for rotation therewith; and
   an annular plate fixed to and extending radially from the rotary shaft and in parallel with the high pressure side surface of said inner ring with an annular gap therebetween.

2. A bearing according to claim 1 wherein an annular notch is provided at a juncture of an inner peripheral surface and a high pressure side surface of the other of said inner and outer rings and wherein an inner peripheral edge of said seal extends to within said annular notch.

3. A bearing according to claim 1 wherein said seal has an outer peripheral edge fixed to said outer ring.

4. A bearing according to claim 2 wherein said seal has an outer peripheral edge fixed to said outer ring.

5. A bearing according to claim 1 wherein a plurality of through holes are formed circumferentially arranged in said annular plate.

6. A bearing according to claim 5 wherein said through holes are formed on or near an inner peripheral edge of said annular plate.

7. A bearing according to claim 1 wherein said high-pressure facing surface of said seal is parallel to radially extending side surfaces of said rings and wherein said blades are perpendicular to said high-pressure facing surface of said seal.

8. A bearing comprising:
   inner and outer rings spaced to define an annular gap therebetween, said gap extending from a high pressure side to a low pressure side;
   a plurality of rolling elements held between said inner and outer rings, said gap extending across the width of said rings;
   a pair of seals fixed to one of said inner and outer rings on opposing high pressure and low pressure sides of said rolling elements and extending across said gap to a point closely adjacent the other of said rings; and
   a plurality of blades protruding from and extending radially along only a high-pressure outer surface of the seal on said high-pressure side, said high-pressure outer surface being parallel to radially extending side surfaces of said rings, said blades rotating to reduce ambient pressure adjacent said inner ring on the high-pressure side and thereby reduce fluid flow from the high-pressure side, through said gap, to the low pressure side.

9. A bearing according to claim 8, wherein said seal has an outer peripheral edge fixed to said outer ring.

10. A bearing according to claim 8 wherein an annular notch is provided at a juncture of an inner peripheral surface and the radially extending side surface of said inner ring on the high-pressure side and wherein an inner peripheral edge of said seal extends to within said annular notch.

11. A bearing according to claim 10 wherein said inner ring is fixed and said outer ring is rotatable.

12. A bearing according to claim 10 wherein said outer ring is fixed and said inner ring is rotatable.

13. A bearing according to claim 8 wherein said blades are perpendicular to the high-pressure outer surface of the seal on said high-pressure side.

* * * * *